(12) United States Patent
Alexander et al.

(10) Patent No.: US 10,968,023 B2
(45) Date of Patent: Apr. 6, 2021

(54) SECURED DELIVERY CONTAINER

(71) Applicant: Ember Technologies, Inc., Westlake Village, CA (US)

(72) Inventors: Clayton Alexander, Westlake Village, CA (US); Christopher Thomas Wakeham, Solana Beach, CA (US); Daren John Leith, Agoura Hills, CA (US); Mikko Juhani Timperi, San Marcos, CA (US)

(73) Assignee: Ember Technologies, Inc., Westlake Village, CA (US)

( * ) Notice: Subject to any disclaimer, the term of this patent is extended or adjusted under 35 U.S.C. 154(b) by 79 days.

(21) Appl. No.: 16/087,610

(22) PCT Filed: Mar. 30, 2017

(86) PCT No.: PCT/US2017/025133
§ 371 (c)(1),
(2) Date: Sep. 21, 2018

(87) PCT Pub. No.: WO2017/173138
PCT Pub. Date: Oct. 5, 2017

(65) Prior Publication Data
US 2019/0112119 A1    Apr. 18, 2019

Related U.S. Application Data

(60) Provisional application No. 62/316,882, filed on Apr. 1, 2016.

(51) Int. Cl.
*F25D 29/00* (2006.01)
*B65D 81/18* (2006.01)
(Continued)

(52) U.S. Cl.
CPC .......... *B65D 81/18* (2013.01); *A47J 36/2483* (2013.01); *A47J 39/00* (2013.01); *A47J 47/145* (2013.01);
(Continued)

(58) Field of Classification Search
CPC ... A47J 47/145; B60H 1/00264; B65D 55/02; B65D 81/18; F25D 11/003; F25D 29/003
See application file for complete search history.

(56) References Cited

U.S. PATENT DOCUMENTS 3,605,431 A * 9/1971 Carson ................. F25D 23/069
62/190
4,830,190 A * 5/1989 Inagaki ................. A47J 41/005
126/261
(Continued)

FOREIGN PATENT DOCUMENTS

CN          1502513 A      6/2004
CN        101109795 A      1/2008
(Continued)

OTHER PUBLICATIONS

PCT International Search Report and Written Opinion dated Jun. 20, 2017, regarding International Application No. PCT/US17/25133, 12 pages.
(Continued)

*Primary Examiner* — Jonathan Bradford
(74) *Attorney, Agent, or Firm* — Knobbe, Martens, Olson & Bear LLP

(57) ABSTRACT

A secure delivery container can have a body with a chamber that can receive one or more items for delivery to an end recipient and a door actuatable to close the chamber in a locked position and open to allow access to the items. The container can have a heat transfer system with one or more heat transfer elements in thermal communication with one or more surfaces of the body that define the chamber and configured to heat or cool the one or more surfaces to heat or cool the delivery items in the chamber. The container can wirelessly communicate with a remote electronic device to receive information from the remote electronic device and to
(Continued)

communicate operational information from the one or more heat transfer elements to the remote electronic device.

16 Claims, 3 Drawing Sheets

(51) Int. Cl.

| | | |
|---|---|---|
| *A47J 39/00* | (2006.01) | |
| *G07C 9/29* | (2020.01) | |
| *F25D 11/00* | (2006.01) | |
| *H04W 4/029* | (2018.01) | |
| *A47J 36/24* | (2006.01) | |
| *A47J 47/14* | (2006.01) | |
| *B65D 25/06* | (2006.01) | |
| *B65D 55/02* | (2006.01) | |
| *G06Q 10/08* | (2012.01) | |
| *G07C 9/00* | (2020.01) | |
| *G06Q 50/28* | (2012.01) | |

(52) U.S. Cl.
CPC ............ *B65D 25/06* (2013.01); *B65D 55/02* (2013.01); *F25D 11/003* (2013.01); *G06Q 10/0832* (2013.01); *G06Q 10/0833* (2013.01); *G07C 9/00182* (2013.01); *G07C 9/29* (2020.01); *H04W 4/029* (2018.02); *F25B 2321/023* (2013.01); *G06Q 50/28* (2013.01); *G07C 2009/00261* (2013.01)

(56) References Cited

U.S. PATENT DOCUMENTS

| | | | |
|---|---|---|---|
| 5,582,095 A | 12/1996 | Rial | |
| 6,457,323 B1 * | 10/2002 | Marotta | B65D 25/06 |
| | | | 62/371 |
| 6,871,921 B2 * | 3/2005 | Ernst | A47B 88/994 |
| | | | 312/348.3 |
| 8,499,683 B2 | 8/2013 | Shei | |
| 8,590,922 B2 * | 11/2013 | Kim | B60R 21/213 |
| | | | 280/728.2 |
| 8,733,867 B2 * | 5/2014 | Hwang | F25D 23/069 |
| | | | 312/402 |
| 9,981,778 B2 * | 5/2018 | Plattner | B65D 25/06 |
| 2001/0042743 A1 | 11/2001 | Faires et al. | |
| 2005/0028543 A1 | 2/2005 | Whitehead et al. | |
| 2005/0081558 A1 * | 4/2005 | Yoshida | F25D 11/003 |
| | | | 62/457.9 |
| 2005/0091988 A1 * | 5/2005 | Stewart | B60P 3/0257 |
| | | | 62/3.1 |
| 2006/0237427 A1 | 10/2006 | Logan | |
| 2009/0283510 A1 | 11/2009 | Johnston | |
| 2012/0252488 A1 | 10/2012 | Hartmann et al. | |
| 2014/0216060 A1 * | 8/2014 | Ilercil | A01N 1/0252 |
| | | | 62/3.6 |
| 2014/0231406 A1 | 8/2014 | Tsang et al. | |
| 2014/0333190 A1 | 11/2014 | Kim | |

FOREIGN PATENT DOCUMENTS

| | | |
|---|---|---|
| CN | 201042350 Y | 4/2008 |
| CN | 101507261 A | 8/2009 |
| CN | 201612420 U | 10/2010 |

OTHER PUBLICATIONS

Office Action for European Application No. 17776686.2, dated Mar. 27, 2020, 6 pages.
Chinese Office Action, regarding Application No. 201510869257.5, dated Aug. 30, 2018, 9 pages.
European Search Report dated Jul. 31, 2019, regarding Application No. 17776676.2, 6 pages.

\* cited by examiner

SECURED DELIVERY CONTAINER

CROSS-REFERENCE TO RELATED APPLICATIONS

This application is related to U.S. application Ser. No. 14/712,313, filed May 14, 2015, the entire contents of all of which are hereby incorporated by reference and should be considered a part of this specification.

BACKGROUND

Field

The present invention is directed to a secured delivery container, and more particularly to a secured delivery container with actuatable heating and/or cooling chambers.

Description of the Related Art

Consumers use delivery services for the delivery of all types of goods. Food delivery (e.g., of groceries, pizza, etc.) and of documents (e.g., legal documents) is commonly used. With respect to food delivery containers, these are often just passive insulated containers (e.g., pizza bags) to try to keep the food cool or warm during transit, but that do not prevent the food from losing its temperature; if the delivery time is long (e.g., due to traffic or distance), the food once delivered is likely to be closer to room temperature rather than in a cooled or heated state (as desired). Additionally, whether food or documents, the delivery containers are generally not secured, so that the end recipient of the goods has no way of knowing if the items have been tampered with (e.g., if the food has been tampered with, if the documents have been viewed or tampered with).

SUMMARY

Accordingly, there is a need for an improved delivery container operable to actively maintain food carried in the delivery container in a cooled or heated state, as desired, or to not actively heat or cool where the delivery contents are not foodstuff. Additionally, there is a need for an improved delivery container that can be locked once closed, and where the end recipient of the goods is the only one allowed to open the delivery container.

In accordance with one aspect, a secure delivery container is provided. The container comprises a body having a chamber configured to receive one or more items for delivery to an end recipient. A door is actuatable to close the chamber to lock the delivery items in the chamber, and actuatable to allow access to the delivery items in the chamber. The container also comprises a heat transfer system. The heat transfer system comprises one or more heat transfer elements in thermal communication with one or more surfaces of the body that define the chamber and configured to heat or cool said one or more surfaces to heat or cool the delivery items in the chamber. The heat transfer system also comprises control circuitry configured to control the operation of the one or more heat transfer elements. A transceiver is configured to wirelessly communicate with a remote electronic device, the transceiver configured to receive information from the remote electronic device and communicate said information to the control circuitry, the transceiver configured to communicate operational information from the one or more heat transfer elements, or control circuitry to the remote electronic device.

DETAILED DESCRIPTION

Figure 1A:
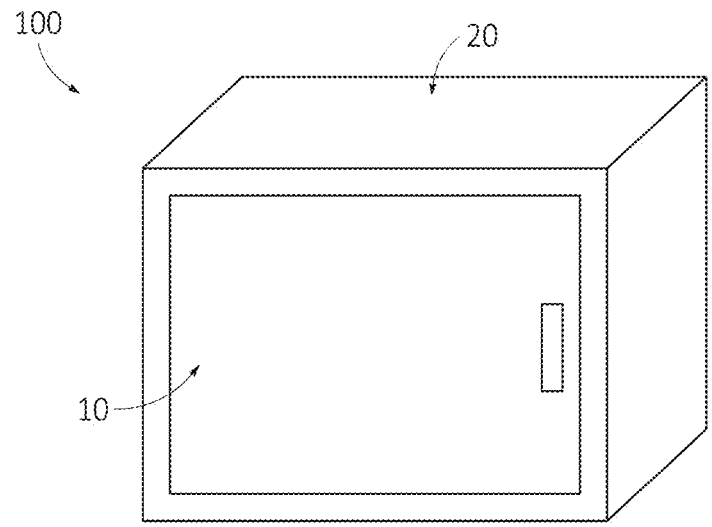
FIG. 1A is a schematic front view of one embodiment of a delivery container in the open state.
Figure 1B:
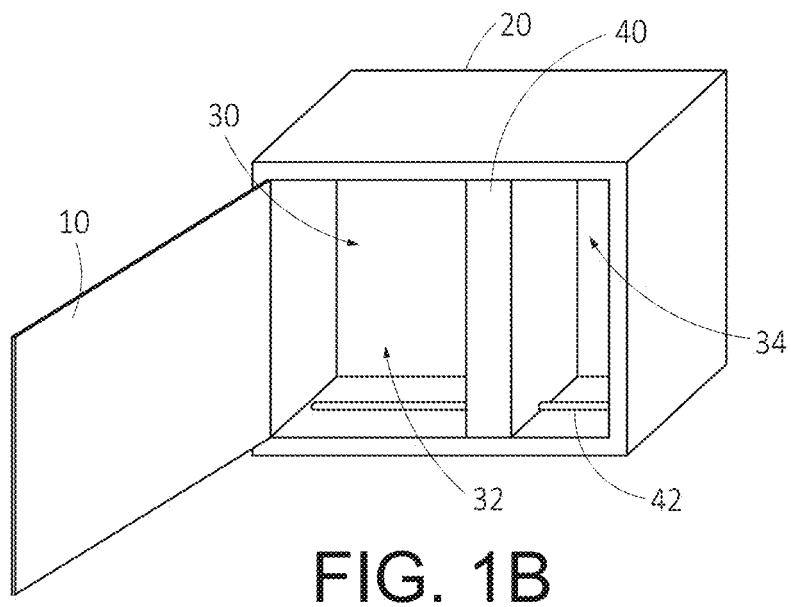
FIG. 1B is a schematic front view of the delivery container of FIG. 1A in the closed state.

FIGS. 1A-1B show one embodiment of a portable delivery container 100. In one embodiment, the container 100 can be used to deliver hot cooked food (e.g., pizza) or cold foodstuff (e.g., soft drinks, beer, dessert). In another embodiment, the container 100 can be used to deliver uncooked food (e.g., for cooking in the user's home once delivered). In still another embodiment, the container 100 can be used to deliver groceries. In still another embodiment, the container 100 can be used to deliver non-foodstuff contents, such as documents (e.g., legal documents).

The delivery container 100 can have a door or cover 10 and a body 20 with a chamber 30 that is sealingly closed by the door or cover 10. The chamber 30 can have one or more subchambers defined by one or more walls 40. In the illustrated embodiment, the chamber 30 can have two subchambers 32, 34 defined by a wall 40 that divides the chamber 30 into the two chambers 32, 34. One of skill in the art will recognize that the chamber 30 can be subdivided into more than 2 subchambers, or that the chamber 30 can be a single chamber (i.e., not have a wall that subdivides the chamber). The delivery container 100 is preferably portable and easily carried by the delivery personnel, as well as sized to fit in an automobile trunk or passenger seat.

In one embodiment, the wall 40 can be movable to adjust the position of the wall 40 within the chamber 30, thereby adjusting the respective sizes of the subchambers 32, 34 (e.g., adjust the size of the heated and cooled chambers, as described below). In one embodiment, the wall 40 can be disposed on one or more tracks 42 that allow the wall 40 to move (e.g. slide) within the chamber 30.

In one embodiment, one or more walls 40 can subdivide the chamber 30 into one or more subchambers that can be selectively heated or cooled. For example, in the illustrated embodiment where the chamber 30 is subdivided into two subchambers 32, 34, one of the subchambers 32 can be selectively heated (e.g., to a desired temperature) and the other of the subchambers 34 can be cooled (e.g., to a desired temperature). In another embodiment, each of the two subchambers 32, 34 can be selectively heated, for example to the same temperature or to different temperatures, or each of the two subchambers 32, 34 can be selectively cooled, for example to the same temperature or to different temperatures. Accordingly, in some embodiments, the delivery container 100 only provides heating, and in other embodiments the delivery container 100 only provides cooling. In still another embodiment, the one or more subchambers 32, 34 cannot be heated or cooled (e.g., when delivering documents).

In one embodiment, the delivery container 100 can optionally have one or more heat transfer elements 50, which can include one or more heating elements 52 and one or more cooling elements 54. In one embodiment, the one or more heating elements 52 and cooling elements 54 can be the part of the same device (e.g., a thermoelectric heater, a Peltier element). In one embodiment, the one or more heating elements 52 can be an active heater (e.g., a resistive heater, a coil heater) or a passive heater (e.g., phase change material that's been previously heated to transfer heat to the food contents in the heated subchamber) and the one or more cooling elements 54 can be an active cooling element (e.g., a refrigeration cycle, a fan), or a passive cooling element (e.g., a phase change material that is in a solid state and can draw heat from the food contents in the cooled subchamber). In one embodiment, the one or more heat transfer elements 50 can be housed in the one or more walls 40 of the container 100 (e.g., a heating element adjacent one face of the wall 40 and a cooling element adjacent the opposite face of the wall 40). In another embodiment, the one or more heat transfer elements 50 can be in thermal communication with one or more surfaces of the container 100 that define the chamber 30.

Figure 2:
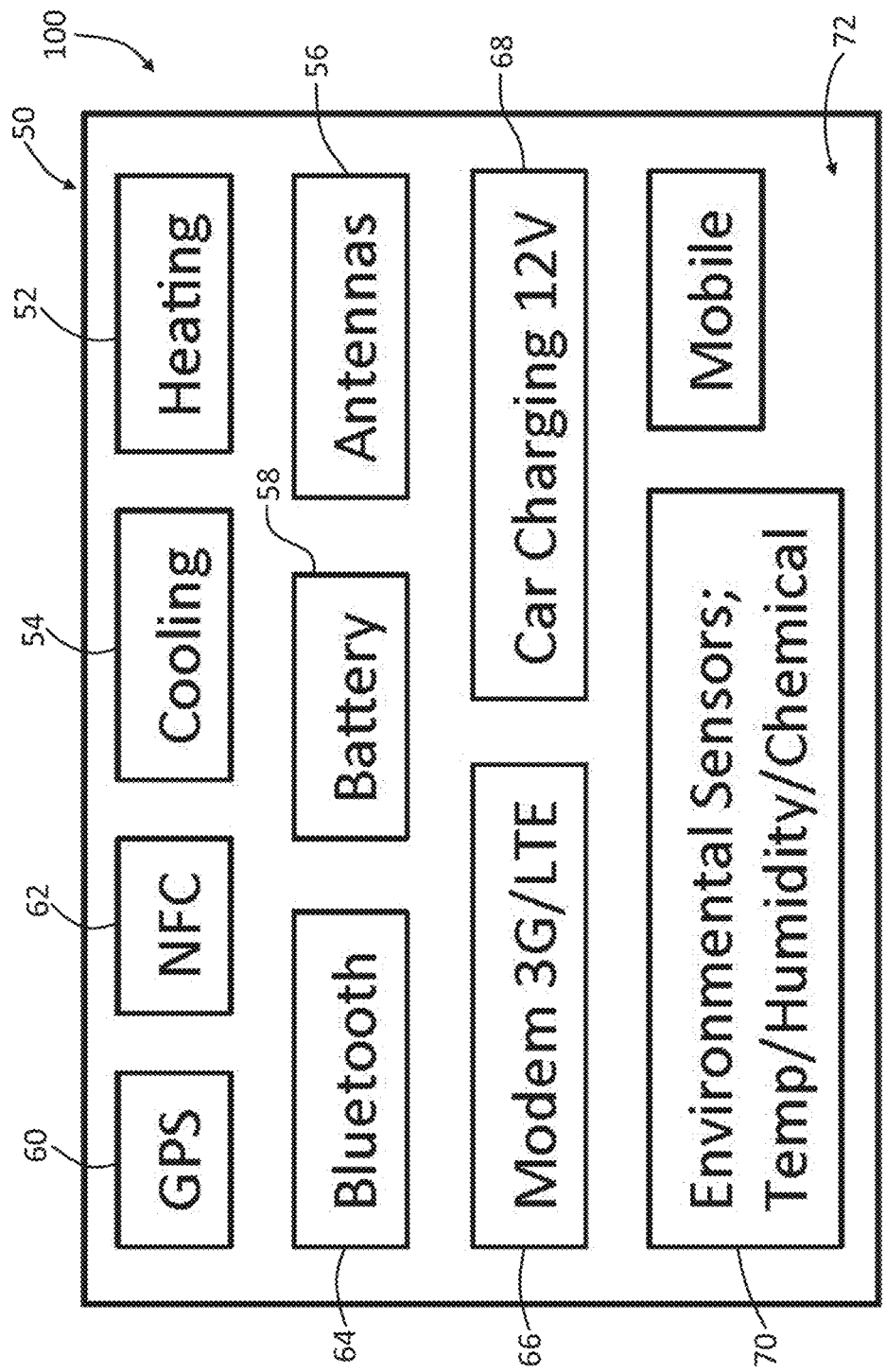
FIG. 2 is a schematic view of one embodiment of features of the delivery container.

With reference to FIG. 2, in addition to the one or more heat transfer elements 50, the delivery container 100 can optionally have one or more antennas 56, optionally have one or more power storage elements 58 (e.g., batteries), optionally have a GPS module 60, optionally have a near field communication module 62, optionally have a Bluetooth module 64, optionally have a modem 66, optionally have a car charging module 68, and optionally have one or more sensors 70. The one or more sensors 70 can sense at least one parameter in the chamber 30 (e.g., temperature, humidity, chemicals, etc.). In one embodiment, control circuitry 72 can operate the one or more heat transfer elements 50 based at least in part on sensed information communicated to the control circuitry 72 by the one or more sensors 70.

In one embodiment, the electronics (e.g., control circuitry 72, GPS module 60, Bluetooth module 64, etc.) or electronic module of the delivery container 100 can be powered by the one or more power storage elements 58, which can be recharged using, for example, the car charging module 68 using the car charger connector. In another embodiment, the one or more power storage elements 58 can be excluded from the delivery container 100 and the electronics powered directly by connecting with the car charging connector.

In one embodiment, the delivery container 100 can be paired with a customer identification number. The door 10 to the container 100 can be opened via an action by the end recipient or customer, for example via the near field communication module 62 (e.g., activate the opening of the door 10 by entering a code via a smartphone or tablet computer). In one embodiment, a mobile app (e.g., Apple Pay app) on a smartphone or tablet computer can be used to activate the opening of the door 10. The end recipient could also pay for the delivery at the same time as opening the delivery container 100 (e.g., using the same action to open the container 100 and pay for the delivery). Advantageously, by allowing only the end recipient to unlock and open the container 100, they are assured that the contents (e.g., foodstuff, documents) have not been tampered with.

The GPS module 60 can optionally be used to track the travel route or position of the delivery container 100. In one embodiment, GPS information can be communicated wirelessly to the end recipient, for example via the one or more antennas 56 of the container 100.

In one embodiment, drivers of services such as Uber or Lyft, or of delivery or courier services, could have at least one of the delivery containers 100 in their automobile to deliver food (e.g., pizza), groceries or non-foodstuff materials (e.g., documents, packages) to an end recipient.

Figure 3:
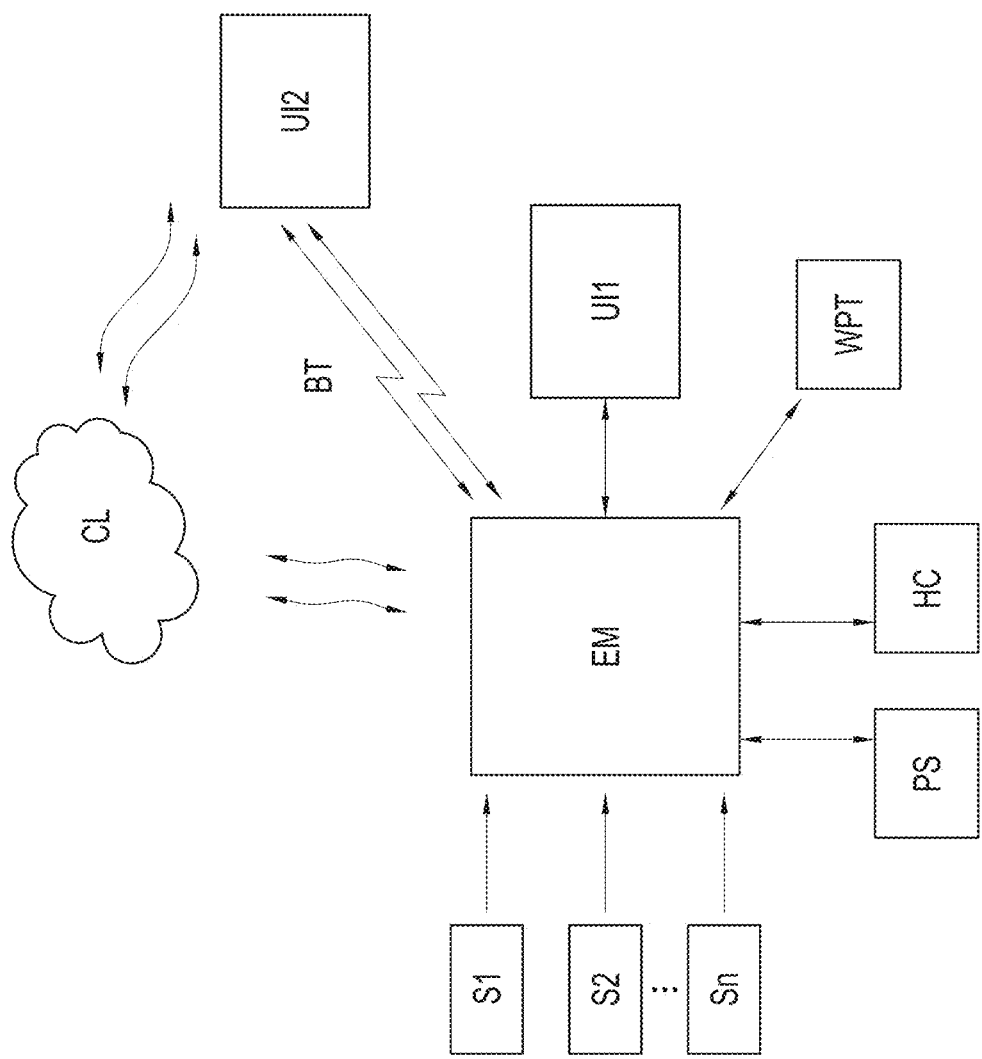
FIG. 3 shows a schematic block diagram showing communication between an electronic module in one embodiment of a delivery container and a remote electronic device.

FIG. 3 shows a block diagram of a communication system for the devices described herein (e.g., the container 100). In the illustrated embodiment, the electronic module EM (such as the electronic module disclosed herein for the container 100) can receive sensed information from one or more sensors S1-Sn (e.g., temperature sensors, humidity sensors, battery charge sensors, tilt sensors or gyroscopes). The electronic module EM can also receive information from and transmit information (e.g., instructions) to one or more heating or cooling elements HC (e.g., to operate each of the heating or cooling elements in a heating mode, in a cooling mode, turn off, turn on, vary power output of, etc.) and optionally to one or more power storage devices PS (e.g., batteries, such as to charge the batteries or manage the power provided by the batteries to the one or more heating or cooling elements). The electronic module EM can also communicate with a wireless power transmitter WPT (e.g., an inductive power transmitter). The electronic module EM can also communicate with (e.g., transmit information to and receive information, such as user instructions from, a user interface UI1 on the unit (e.g., on the body of the container 100). The electronic module EM can also communicate with an electronic device UI2 (e.g., a mobile electronic device such as a mobile phone, PDA, tablet computer, laptop computer, electronic watch; or a desktop computer) via the cloud CL or via a wireless communication system such as Bluetooth BT. The electronic device UI2 can have a user interface that can display information associated with the operation of the container 100 (as disclosed herein).

While certain embodiments of the inventions have been described, these embodiments have been presented by way of example only, and are not intended to limit the scope of the disclosure. Indeed, the novel methods and systems described herein may be embodied in a variety of other forms. For example, though the features disclosed herein are described for delivery containers, the features are applicable to containers that are not delivery containers (e.g., lunch boxes, camping food storage chests, refrigeration devices, cold boxes, coolers, portable coolers, or portable refrigerators, or hot boxes, or warmer drawers, or heat chambers) and the invention is understood to extend to such other containers. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The term "electronic module" is meant to refer to electronics generally. Furthermore, the term "electronic module" should not be interpreted to require that the electronics be all in one physical location or connected to one single printed circuit board (PCB). One of skill in the art will recognize that the electronic module or electronics disclosed herein can be in one or more (e.g., plurality) of separate parts (coupled to one or a plurality of PCBs) and/or located in different physical locations of the body of the container, as disclosed herein. That is, the electronic module or electronics can have different form factors.

Of course, the foregoing description is that of certain features, aspects and advantages of the present invention, to which various changes and modifications can be made without departing from the spirit and scope of the present invention. Moreover, the heated or cooled drinkware need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed containers.

What is claimed is:
1. A secure delivery container, comprising:
   a body sized to fit in an automobile trunk or passenger seat and having a chamber configured to receive one or more items for delivery to an end recipient;

a door actuatable to close the chamber to enclose the delivery items in the chamber, and actuatable to allow access to the delivery items in the chamber;

a heat transfer system comprising one or more heat transfer elements having a surface in thermal communication with one or more surfaces of the body that define the chamber and configured to heat or cool said one or more surfaces to heat or cool the delivery items in the chamber, and circuitry configured to control the operation of the one or more heat transfer elements to heat or cool the delivery items during transit of the container;

a transceiver configured to wirelessly receive information and communicate said information to the circuitry, the transceiver configured to wirelessly transmit operational information from the one or more heat transfer elements or circuitry; and one or more partition walls configured to partition the chamber into a plurality of separate thermally isolated subchambers, at least one of the subchambers being in thermal communication with at least one of the one or more heat transfer elements, the one or more partition walls being slidable within the chamber between opposite sidewalls of the chamber to adjust a position of the one or more partition walls within the chamber to thereby adjust the respective sizes of the plurality of separate subchambers.

2. The delivery container of claim 1, further comprising one or more batteries configured to deliver power to one or both of the circuitry and one or more heat transfer elements.

3. The delivery container of claim 1, wherein at least one of the one or more heat transfer elements is disposed in the one or more partition walls.

4. The delivery container of claim 1, wherein the one or more heat transfer elements are one or more heating elements.

5. The delivery container of claim 1, further comprising a GPS sensor configured to track the location of the container.

6. The delivery container of claim 1, wherein the door is configured to lock to close the chamber once the delivery items are placed in the chamber, and wherein the door is configured to be unlocked by the end recipient at the point of delivery.

7. The delivery container of claim 6, wherein the door is configured to receive a signal wirelessly from a mobile electronic device to unlock the door and allow access to the delivery items.

8. The delivery container of claim 1, further comprising an electrical connector configured to allow power delivery to the container from an automobile power connector.

9. The delivery container of claim 1, wherein one of the subchambers is configured to be heated by at least one of the one or more heat transfer elements and another of the subchambers is configured to be cooled by at least one of the one or more heat transfer elements.

10. The delivery container of claim 9, wherein the subchamber that is heated is configured to receive heated foodstuff and the subchamber that is cooled is configured to receive cooled foodstuff.

11. The delivery container of claim 1, further comprising one or more sensors configured to sense a parameter in the chamber and to communicate the sensed information to the circuitry, the circuitry configured to control the operation of the one or more heat transfer elements based at least in part on the sensed information.

12. The delivery container of claim 11, wherein the one or more sensors are chosen from a group consisting of a temperature sensor, a humidity sensor, and a chemical sensor.

13. A secure delivery container, comprising:

a body sized to fit in an automobile trunk or passenger seat and having a chamber configured to receive one or more items for delivery to an end recipient;

a door actuatable to close the chamber to lock the delivery items in the chamber, and actuatable to allow access to the delivery items in the chamber;

a heat transfer system comprising one or more heat transfer elements having a surface in thermal communication with one or more surfaces of the body that define the chamber and configured to heat or cool said one or more surfaces to heat or cool the delivery items in the chamber, and circuitry configured to control the operation of the one or more heat transfer elements to heat or cool the delivery items during transit of the container;

a transceiver configured to wirelessly receive information and communicate said information to the circuitry and to wirelessly transmitoperational information from the one or more heat transfer elements or circuitry; and one or more partition walls configured to partition the chamber into a plurality of separate thermally isolated subchambers, at least one of the subchambers being in thermal communication with at least one of the one or more heat transfer elements, the one or more partition walls being slidable within the chamber between opposite sidewalls of the chamber to adjust a position of the one or more partition walls within the chamber to thereby adjust the respective sizes of the plurality of separate subchambers, wherein the door is configured to lock to close the chamber once the delivery items are placed in the chamber, and wherein the circuitry is operable to unlock the door upon receipt of a signal wirelessly from the end recipient to allow access to the delivery items.

14. The delivery container of claim 13, further comprising one or more batteries configured to deliver power to one or both of the circuitry and one or more heat transfer elements.

15. The delivery container of claim 13, wherein the one or more heat transfer elements are one or more heating elements.

16. The delivery container of claim 13, further comprising a GPS sensor configured to track the location of the container.

* * * * *

UNITED STATES PATENT AND TRADEMARK OFFICE
CERTIFICATE OF CORRECTION

PATENT NO. : 10,968,023 B2  
APPLICATION NO. : 16/087610  
DATED : April 6, 2021  
INVENTOR(S) : Clayton Alexander et al.

It is certified that error appears in the above-identified patent and that said Letters Patent is hereby corrected as shown below:

In the Specification

In Column 4, Line 22, delete "(e.g.," and insert -- e.g., --.

In the Claims

In Column 8, Line 31, Claim 13, delete "transmitoperational" and insert -- transmit operational --.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*